United States Patent [19]
Tajima et al.

[11] Patent Number: 5,613,236
[45] Date of Patent: Mar. 18, 1997

[54] CLIP HOLDER FOR A PORTABLE RECEIVER

[75] Inventors: Kazuaki Tajima, Yokohama; Masahiro Kikuchi, Mizusawa, both of Japan

[73] Assignee: Oi Denki Co., Ltd., Japan

[21] Appl. No.: 286,090

[22] Filed: Aug. 4, 1994

[51] Int. Cl.[6] .................................................. H04B 1/08
[52] U.S. Cl. .......................................... 455/351; 224/269
[58] Field of Search ...................................... 224/252, 269, 224/247; 24/3.11, 3.12, 511; 361/814; 340/825.44, 311.1; 455/89, 90, 32.1, 38.4, 100, 346, 347, 348, 351

[56] References Cited

U.S. PATENT DOCUMENTS

| | | | |
|---|---|---|---|
| 1,892,918 | 1/1933 | Waller | 24/511 |
| 2,059,582 | 11/1936 | Hurewitz | 24/511 |
| 3,214,685 | 10/1965 | Brenner | 224/269 |
| 4,780,934 | 11/1988 | Vickers et al. | 224/252 |
| 4,828,153 | 5/1989 | Guzik et al. | 224/252 |
| 4,956,895 | 9/1990 | Hayasaka | 224/252 |
| 5,182,553 | 1/1993 | Kung | 340/825.44 |
| 5,278,993 | 1/1994 | Reiff et al. | 455/90 |
| 5,356,060 | 10/1994 | Kuroda | 224/252 |
| 5,385,282 | 11/1995 | Chen | 224/252 |
| 5,414,596 | 5/1995 | Eaton et al. | 455/351 |

*Primary Examiner*—Andrew Faile
*Attorney, Agent, or Firm*—Loeb & Loeb LLP

[57] ABSTRACT

A clip holder for holding a portable receiver having a front panel, back panel, sides, and a display on the front panel. The clip holder has two members, a receiver holder and a clip plate. The receiver holder and clip plate are attached to opposite ends of a pivot disposed within a cam. The clip plate and receiver holder may be maintained in any position about the pivot because the cam is friction engaged with the receiver holder in all positions. The receiver is engaged to an outer surface of the receiver holder. The clip holder may be attached to a user's belt or waist garment when the belt or garment is located between the clip plate and receiver holder. The clip holder is secured to the user's waist when the receiver holder is fully rotated toward the clip plate so the clip plate and receiver are in a substantially parallel orientation. The user may view the visual display of the receiver when the clip holder is secured to the waist garment by rotating the receiver away from the user's body so the front panel and display face the user's line of vision. In this way, the user may view the display without having to remove the clip holder from the waist or the receiver from the clip holder.

13 Claims, 7 Drawing Sheets

5,613,236

CLIP HOLDER FOR A PORTABLE RECEIVER

FIELD OF THE PRESENT INVENTION

The present invention is directed toward an apparatus for holding a portable receiver type device such as a radio pager, and more particularly toward a clip for attaching the receiver to a portable receiver user's belt, waist, or piece of clothing in a manner that will allow the user to conveniently observe the display of the receiver.

BACKGROUND OF THE INVENTION

Portable radio receivers or pagers are often carried with the user. With prior art holder devices, users could attach the pager to a piece of clothing or waist belt. Prior art holders were designed to position a display of the pager at the upper end of the clip holder to allow the user to view the display content without having to remove the portable pager body from the belt or clothing. Because of the limited surface area of the upper end of the pager, the display would usually be comprised of only one line.

One problem with these prior art clip holders is that newer pagers have a larger display located on the front face of the receiver. Users are often unable to read all the information on the display because the user looking down toward the top side of the receiver cannot see the display on the from panel. For these reasons, users often have trouble reading a pager display attached to their waist or clothing. To observe all the information on the larger pager displays located on the from face of the receiver, users often have to remove the pager from the belt or waist garment.

SUMMARY OF THE INVENTION

It is an object of the present invention to provide a pager holder which will allow the user to readily observe an entire pager display located on the front panel of the pager without having to remove the pager and holder from the belt or garment to which it is attached. In this way the user can easily read the message.

It is a further object of the present invention to provide a holder wherein the receiver may be maintained in numerous positions with respect to the clip holder.

It is still a further object of the present invention to provide a clip holder that will allow the user to wear the clip holder and receiver to a waist garment and allow the user to rotate the front panel of the receiver toward the line of vision of the user without having to remove the clip holder and receiver from the waist.

It is still a further object of the present invention to allow the user to change the batteries without having to detach the receiver from the clip holder.

It is still a further object of the invention to provide a clip holder that may be used to maintain the pager in an upright position when the clip holder and pager are placed on a flat surface.

A clip holder is comprised of two members, a receiver holder and clip plate. The receiver holder has an inner surface and outer surface and two opposite ends. The clip plate has an inner surface and outer surface and two opposite ends. The clip holder is adapted to hold a portable receiver having a front panel, back panel, sides, and a display on the front panel. The inner surface of the receiver holder is adapted to be engaged with the back panel of the receiver. The clip plate and receiver holder are attached to opposite sides of a pivot disposed within a cam. The inner surface of the clip plate faces the outer surface of the receiver holder. The receiver holder and clip plate are maintained in a first position, a second position, and a third position about the cam. In the first position, the clip plate is fully rotated toward the receiver holder so the receiver holder and clip plate are substantially parallel to each another. In the second position, the clip plate is fully rotated away from the receiver holder toward a perpendicular orientation. In the third position, the clip plate is in a position with respect to the receiver holder between the first and second positions.

The cam is friction engaged with the outer surface of the receiver holder to maintain the clip plate in the first, second, and third positions with respect to the receiver holder. In the first position, the clip holder may be secured to an article of clothing about the waist of the user. The user may better view the display by rotating the receiver holder into the second position and third position. In this way, the from panel and display of the receiver is rotated toward the user's line of vision so the user may better view the display. When in the second position, the outer surface of the clip plate may be placed on a substantially flat surface such as a table. In this manner, the display is positioned in a substantially upright manner.

The receiver further has a battery cover which may be removed from the surface of the receiver to expose a battery storage area. A battery for the portable receiver is contained in the battery storage area. The battery storage cover is located on the back panel of the receiver. The battery cover may be removed by the user to remove or replace the battery disposed within the receiver. The receiver holder does not extend to cover the battery cover and storage area thereby allowing the user to change the battery without having to detach the receiver from the receiver holder.

DETAILED DESCRIPTION OF THE PREFERRED EMBODIMENTS

Figure 1:
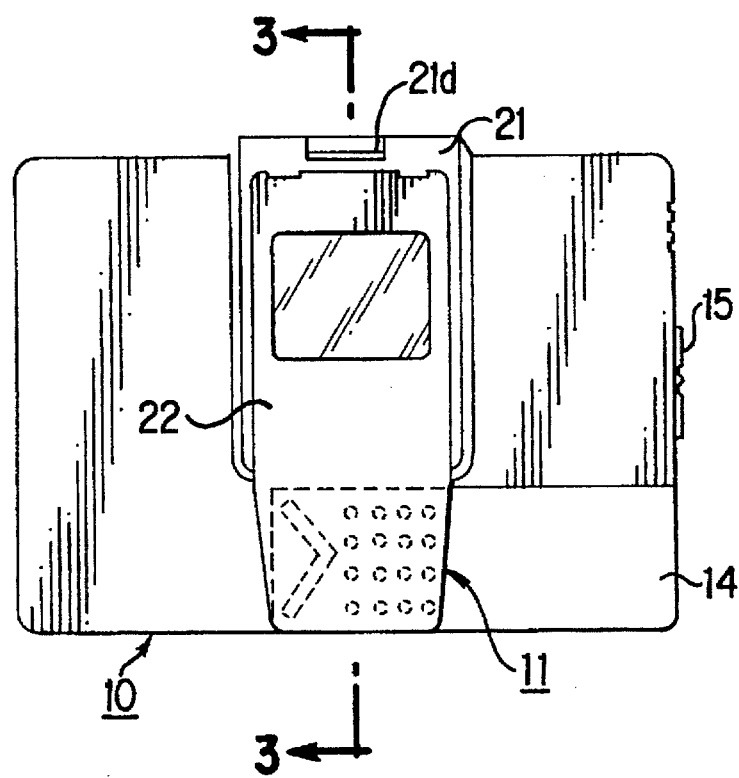
FIG. 1 is a diagram of an exterior view of a pager and clip holder.
Figure 2:
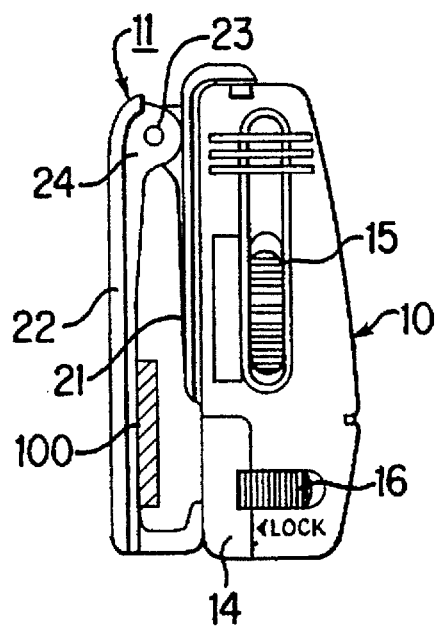
FIG. 2 shows a lateral view of the pager and clip holder.
Figure 3:
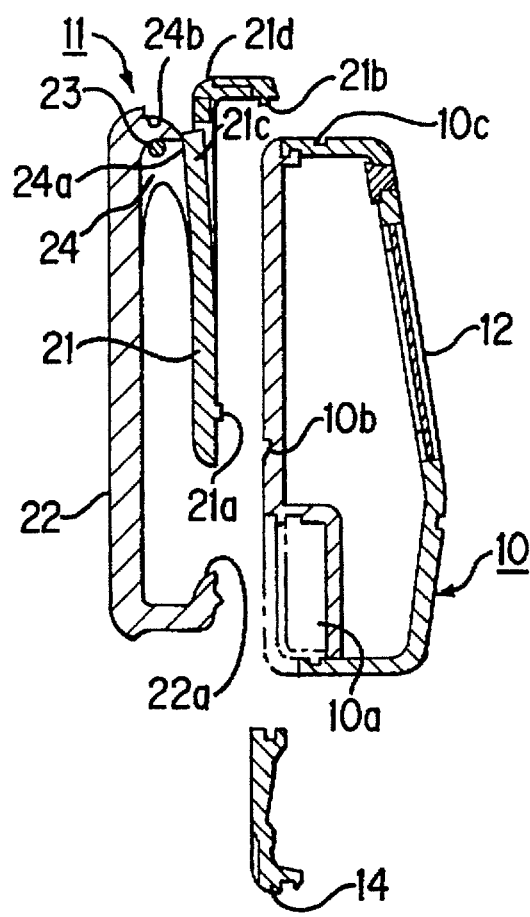
FIG. 3 shows a cross section view of the pager and clip holder.
Figure 6A:
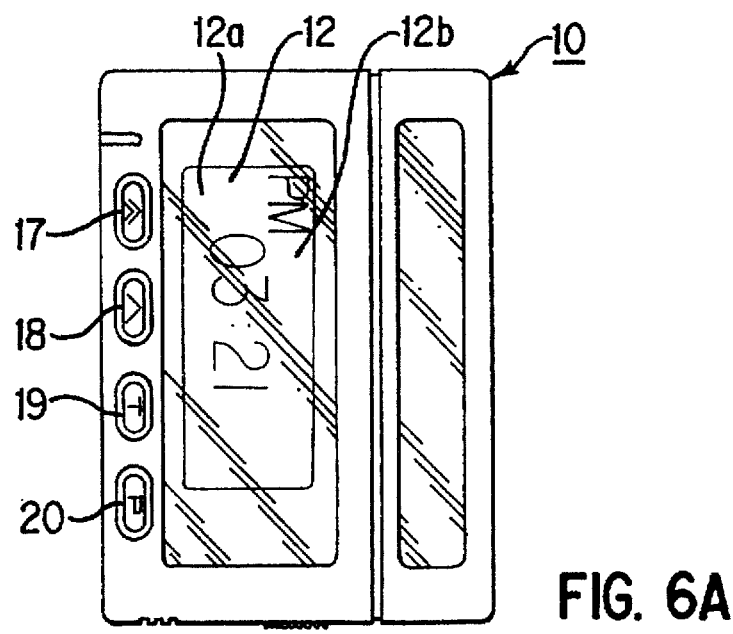
FIGS. 6a and 6b show the clip holder in a fully extended position and the display of the pager, respsectfully.
Figure 6B:
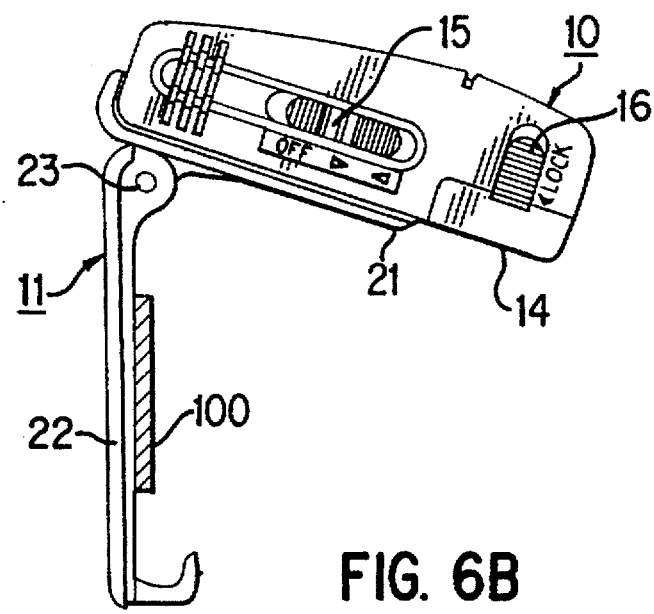
Figure 7:
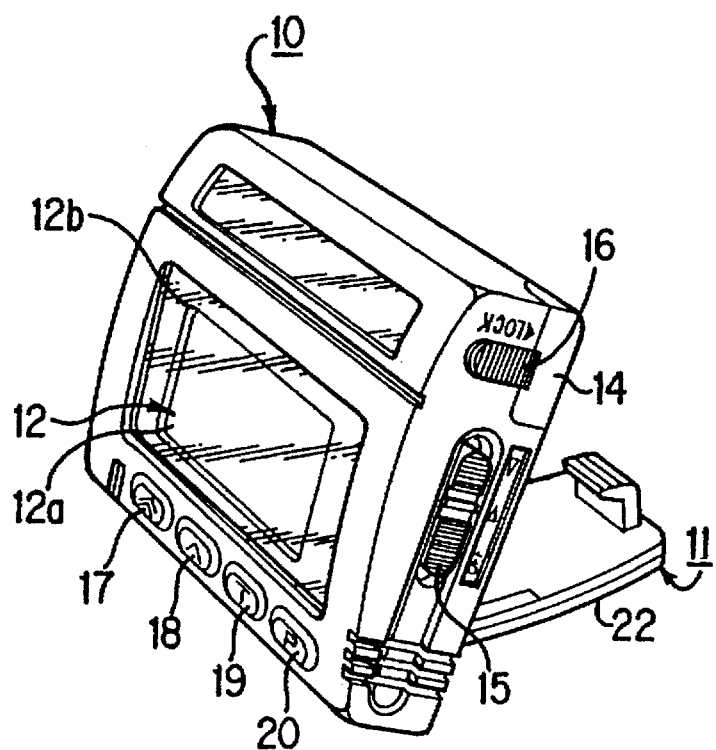
FIG. 7 shows the pager and clip holder in a fully extended position.

A receiver main body 10, as shown in FIGS. 2, 3, 6a, 6b, and 7 is comprised of plastic molding. The receiver main body 10 contains a reception circuit substrate, reception circuit, receiving antenna, display and battery, and other necessary receiver components known in the art. Referring to FIG. 7, the receiver has a front panel, a back panel, and sides. FIGS. 6 and 7 shows a plurality of switches 17, 18, 19, and 20 on the front panel of the receiver which allow the user to control the mode of operation of the receiver. A power switch 15 is shown in FIG. 6b on one of the sides of the receiver. The receiver has a relatively large liquid crystal display 12 ("LCD") on the front panel for displaying receiver information (FIGS. 6a and 7). As shown in FIG. 3, a receiver battery (not shown) is stored in the battery storage area 10a of the receiver body 10. Referring to FIGS. 2, 3, and 6b, a battery cover 14 may be selectively detached from the receiver body 10 to allow the user to replace or remove the battery. The receiver may further have an electronic buzzer or vibration alert to notify the user of a received message.

Figure 5C:
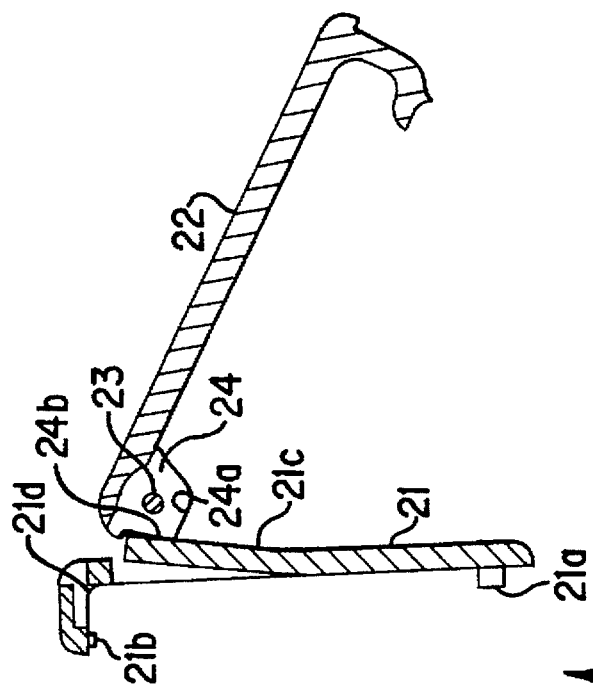
FIGS. 5a, 5b, and 5c show the clip holder disposed in three different positions.

FIG. 3 shows a clip holder 11 having two members, a receiver holder portion 21 and a clip plate 22. In the preferred embodiment both the receiver holder 21 and clip plate 22 are comprised of plastic molding. Both the receiver holder 21 and clip plate 22 are engaged at opposite sides of a pivot 23 and may freely rotate about the pivot 23. FIGS. 2 and 3 show the clip holder 11 in a closed position wherein the receiver holder 21 and clip plate 22 are substantially parallel about the pivot 23. FIGS. 5c and 6b show the clip holder 11 in a fully extended position wherein the receiver holder 21 and clip plate 22 are extended to the fullest extent possible toward a perpendicular orientation about the pivot 23.

With reference to FIG. 3, the receiver holder 21 has a horizontal protrusion 21a and a vertical protrusion 21b. The horizontal protrusion 21a is adapted to be engaged with a groove 10b on the back panel of the receiver body. The vertical protrusion 21b is adapted to be engaged with a groove 10c on a top side of the receiver body 10. The receiver holder 21 is firmly fastened to the receiver main body 10 when the horizontal 21a and vertical 21b protrusions are engaged with back groove 10b and top groove 10c, respectively. The user may insert a driver or other similar device having a flat, thin surface between the receiver 10 and receiver holder 21 to detach the receiver 10 from the receiver holder 21. The receiver holder 21 may have a thin groove 21d for holding a driver (not shown) which the user could use to detach the receiver 10 from the receiver holder 21.

In the preferred embodiment shown in FIG. 3, the receiver holder 21 is shorter in length than the length of the back panel of the receiver body 10 and does not cover or obstruct the battery cover 14. Accordingly, the user may remove the battery cover 14 and change the battery without having to detach the receiver 10 from the receiver holder 21. It should be appreciated that in alternative embodiments the receiver holder 21 may be lengthened in a manner that would obstruct the battery cover 14. In such embodiments, the user would have to detach the receiver 10 from the receiver holder 21 in order to access the battery storage area 10a to replace the battery.

As shown in FIG. 3, the clip plate 22 has a hook 22a which provides for firm engagement with the garment or area to which the clip holder 11 is attached. FIG. 2 shows the clip holder 11 engaged to a belt 100 when the clip plate 22 and receiver holder 21 are in a closed position.

Figure 4C:
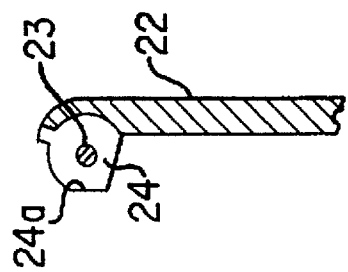
FIGS. 4a, 4b, and 4c show three different embodiments for a cam.
Figure 4B:
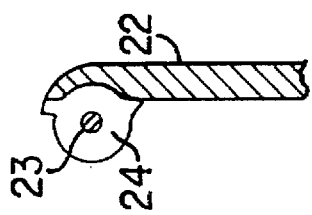
Figure 4A:
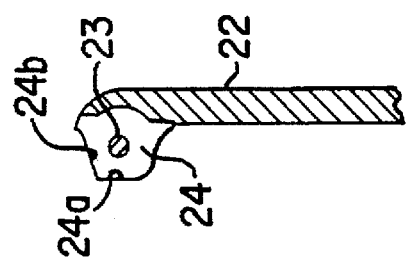

The pivot 23 is disposed within a cam 24. FIGS. 4a, 4b, and 4c show three embodiments of the cam 24. FIG. 4a shows the cam 24 as having two adjacent sides, side one 24a and side two 24b. FIG. 4b shows the cam 24 having a round surface. FIG. 4c shows the cam having only one side 24a. The cam 24 which is friction engaged with the outer surface of the receiver holder 21, maintains the receiver holder 22 in any position with respect to the clip plate 22 from the closed position to the fully extended position.

Figure 5B:
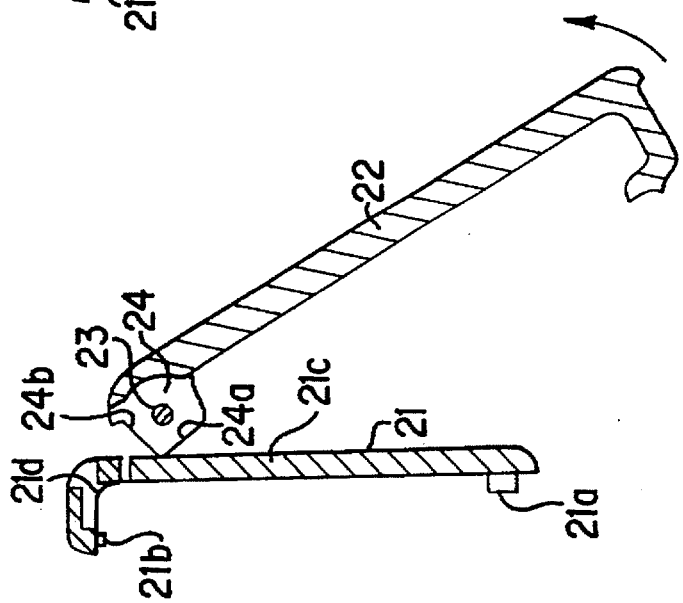
Figure 5A:
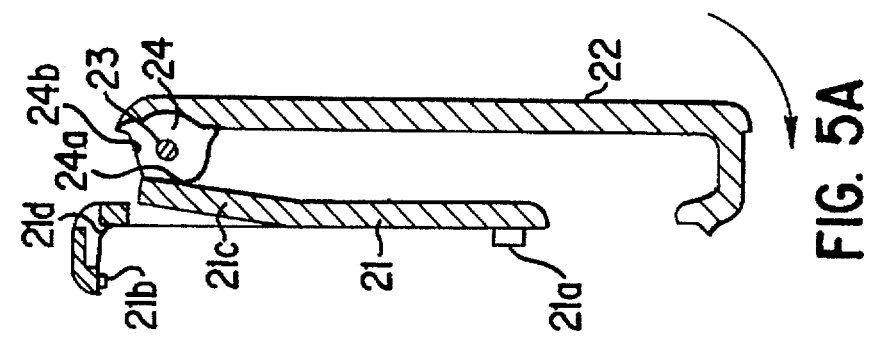

FIGS. 5a, 5b, and 5c show how the receiver holder 21 may be positioned with respect to the clip plate 22 about the pivot 23. The receiver holder 21 has a flexible portion 21c. Friction between the cam 24 and the flexible portion 21c cause the receiver holder 22 to maintain its position with respect to the clip plate 22. The operation of the cam 24 in FIGS. 5a, 5b, and 5c is described with respect to the two-sided cam shown in FIG. 4a. Referring to FIG. 5a, when the clip holder is in the closed position, the cam side one 24a engages with the flexible portion 21c. In response, the flexible portion 21c bends away from the receiver holder 21, and causes the clip plate 22 to move in the clockwise direction toward the receiver holder 21. Accordingly, when worn on the user's waist or belt, the clip plate 22 will secure the clip holder 11 to the user's waist. The clip holder 11 may also be secured to other articles of the user's clothing or a bag.

Referring to FIG. 5b, when rotating the clip plate 22 in the counter-clockwise direction away from the closed position, the cam 24 applies force to the flexible portion 21c causing the flexible portion to bend inward toward the receiver holder 21. In any position between the closed position and the fully extended position, the friction resulting from the engagement of the cam and the flexible portion 21c maintains the position of the clip plate with respect to the receiver holder 21. All the cam 24 embodiments shown in FIGS. 4a, 4b, and 4c provide for this friction effect and maintain the position of the clip plate with respect to the receiver holder in any position from the closed position to the fully extended position.

The use may rotate the clip plate 22 in the counter-clockwise direction until the clip plate 22 is fully extended as shown in FIG. 5c. With the cam shown in FIG. 4a, the fully extended position occurs when the second side 24b of the cam is engaged with the flexible portion 21c. In the other embodiments of the cam 24 shown in FIGS. 4b and 4c, the fully extended position is maintained by the friction resulting from the engagement of a portion of the surface side of the cam 24 with the clip plate 22.

With reference to FIGS. 2 and 5a, when the user wears the receiver 10 and clip holder 11 on a belt 100, the engagement of cam side one 24a with the flexible portion 21c secures the clip holder to the belt 100. Alternatively, with the cam in FIG. 4b, the clip holder 11 is secured to the belt 100 as a result of friction from the round cam 24. When the user needs to check the display when a message is received the user may rotate the receiver 10 away from the clip holder 11 while it is attached to the belt to better view the display as shown in FIG. 6b. A bottom side of the receiver 10 is rotated away from the user's body to position the front panel and display of the receiver within the user's line of vision. The receiver 10 can remain in this extended position as a result of the friction between the cam 24 and the flexible portion 21c. In the extended position shown in FIG. 6b, the user can easily read the information on the LCD display 12 (FIG. 6a) without having to remove the receiver 10 from the clip holder 11 or the clip holder 11 from the belt 100.

In the preferred embodiment shown in FIG. 6a, the characters on the LCD display 12 are oriented such that the lower portion of the characters 12a are directed toward the user's body and the clip plate 22. This character display orientation allows the user to easily read the characters on the LCD display 12 on the front panel when the receiver 10 is engaged with the clip holder 11 on the user's belt 100 and rotated toward the line of vision of the user. In addition, as shown in FIG. 7, with the character orientation of the preferred embodiment, when the clip holder 11 is in the fully extended position, the clip plate can be placed on a desk with the LCD display 12 upright and easily observable to the user seated at the desk and facing the LCD display 12.

We claim:

1. A clip holder for holding a portable receiver, comprising:

a receiver holder, having two opposite ends, an inner surface and an outer surface between the two ends, wherein a portion of the inner surface of the receiver holder is adapted to be engaged with the portable receiver;

a clip plate having opposite ends and an inner surface and an outer surface between the ends;

a cam apparatus wherein a portion of the receiver holder and a portion of the clip plate are attached to opposite sides of the cam apparatus, such that the inner surface of the clip plate faces the outer surface of the receiver holder; and a pivot disposed within the cam apparatus, wherein the clip plate and receiver holder are rotatable about the pivot to maintain the receiver holder in a first position, second position, and third position with respect to the clip plate to be held in each position by the cam apparatus frictionally engaging the receiver holder; and a flexible portion on the outer surface of the receiver holder that extends outwardly away from the receiver holder to frictionally engage the cam to maintain the receiver holder in a fixed position with respect to the clip plate.

2. The clip holder of claim 1, wherein in the first position the clip plate is fully rotated about the pivot in the direction toward the receiver holder, wherein in the second position the clip plate is fully rotated about the pivot in the direction away from the receiver holder, and wherein in the third position the clip plate is rotated about the pivot in any position between the first and second position.

3. The clip holder of claim 1, wherein the outer surface of the cam is round, and wherein a portion of the round surface of the cam is friction engaged with the outer surface of the receiver holder when the clip holder is in the first, second, and third positions.

4. The clip holder of claim 1, wherein the receiver further has a detachable battery cover on the surface of the receiver that covers a battery storage area of the receiver, wherein the length of the receiver holder does not extend to cover the battery cover when the receiver is engaged with the receiver holder.

5. The clip holder of claim 1 for attachment to a garment on the user's waist, wherein the receiver further includes a front panel, a back panel, and sides, and a display located on the front panel wherein the back panel of the receiver is engaged to the receiver holder, wherein in the first position the clip holder and receiver are secured to the waist of the user, and wherein in the second and third positions the receiver and display are rotated away from the user's body to allow the user to better view the display of the receiver.

6. The clip holder of claim 5, wherein the display when rotated away from the user's body toward the horizontal position displays characters such that the characters are in a readable orientation to the user looking downward toward the display.

7. The clip holder of claim 1 for placement on a substantially flat surface, wherein the receiver further includes a front panel, a back panel, sides, and a display located on the front panel wherein the back panel of the receiver is engaged to the receiver holder, wherein the receiver holder and receiver are rotated away from the clip plate about the pivot, and the outer surface of the clip plate is adaptable to be placed on the flat surface so the display is positioned substantially upright with respect to the substantially flat surface.

8. A clip holder for holding a portable receiver, comprising:

a receiver holder, having two opposite ends, an inner surface and an outer surface between the two ends, wherein a portion of the inner surface of the receiver holder is adapted to be engaged with the portable receiver, wherein a portion of a surface area of the portable receiver adjacent to the inner surface of the receiver holder has a plurality of grooves, wherein at least two protrusions extend from the inner surface of the receiver holder, and wherein the protrusions extending from the inner surface of the receiver holder are adapted to be engaged with the corresponding grooves in the receiver;

a clip plate having opposite ends and an inner surface and an outer surface between the ends;

a cam apparatus wherein a portion of the receiver holder and a portion of the clip plate are attached to opposite sides of the cam apparatus, such that the inner surface of the clip plate faces the outer surface of the receiver holder; and a pivot disposed within the cam apparatus, wherein the clip plate and receiver holder are rotatable about the pivot to maintain the receiver holder in a first position, second position, and third position with respect to the clip plate to be held in each position by the cam apparatus frictionally engaging the receiver holder.

9. A clip holder for holding a portable receiver, comprising:

a substantially L-shaped receiver holder having a length and an end portion substantially perpendicular to the length, having two opposite ends, an inner surface and an outer surface between the two ends, wherein a portion of the inner surface of the receiver holder is adapted to be engaged with the portable receiver;

a clip plate having opposite ends and an outer surface and an outer surface between the ends;

a cam apparatus wherein a portion of the receiver holder and a portion of the clip plate are attached to opposite sides of the cam apparatus, such that the inner surface of the clip plate faces the outer surface of the receiver holder, wherein the receiver holder is attached to the cam at the outer surface of the length portion, wherein the inner surface of the length portion and inner surface of the end portion are adjacent to the receiver; and a pivot disposed within the cam apparatus, wherein the clip plate and receiver holder are rotatable about the pivot to maintain the receiver holder in a first position, second position, and third position with respect to the clip plate to be held in each position by the cam apparatus frictionally engaging the receiver holder.

10. The clip holder of claim 9, wherein the portable receiver further includes at least two indented grooves in the surface area of the portable receiver, wherein at least one protrusion extends from the inner surface of the length and at least one protrusion extends from the inner surface of the end portion of the receiver holder, wherein the protrusions extending from the inner surface of the receiver holder are adapted to be mated with the corresponding grooves in the receiver.

11. A clip holder for holding a portable receiver, comprising;

a receiver holder, having two opposite ends, an inner surface and an outer surface between the two ends, wherein a portion of the inner surface of the receiver holder is adapted to be engaged with the portable receiver, and wherein the inner surface of the receiver holder includes a flexible portion, a clip plate having opposite ends and an inner surface and an outer surface between the ends;

a cam apparatus wherein a portion of the receiver holder and a portion of the clip plate are attached to opposite sides of the cam apparatus, such that the inner surface of the clip plate faces the outer surface of the receiver holder; and a pivot disposed within the cam apparatus, wherein the clip plate and receiver holder are rotatable about the pivot to maintain the receiver holder in a first position, second position, and third position with respect to the clip plate to be held in each position by the cam apparatus frictionally engaging the receiver holder, wherein the flexible portion of the receiver holder extends outward when the clip plate is in the first and second positions with respect to the receiver holder, and wherein the flexible portion is engaged with the receiver holder when the clip plate is in the third position.

12. A clip holder for holding a portable receiver, comprising:

a receiver holder, having two opposite ends, an inner surface and an outer surface between the two ends, wherein a portion of the inner surface of the receiver holder is adapted to be engaged with the portable receiver;

a clip plate having opposite ends and an inner surface and an outer surface between the ends;

a cam apparatus having at least two adjacent flat sides, wherein a portion of the receiver holder and a portion of the clip plate are attached to opposite sides of the cam apparatus, such that the inner surface of the clip plate faces the outer surface of the receiver holder, and a pivot disposed within the cam apparatus, wherein the clip plate and receiver holder are rotatable about the pivot to maintain the receiver holder in a first position, second position, and third position with respect to the clip plate to be held in each position by the cam apparatus frictionally engaging the receiver holder, wherein one flat side of the cam apparatus is friction engaged with the outer surface of the receiver holder when the clip holder is in the first position, wherein the other flat side is friction engaged with the outer surface of the receiver holder when the clip holder is in the second position, and wherein the edge between the two sides is friction engaged with the outer surface of the receiver holder when the clip holder is in the third position.

13. A clip holder for holding a portable receiver, comprising:

a receiver holder, having two opposite ends, an inner surface and an outer surface between the two ends, wherein a portion of the inner surface of the receiver holder is adapted to be engaged with the portable receiver;

a clip plate having opposite ends and an inner surface and an outer surface between the ends;

a cam apparatus, wherein the outer surface of the cam has only one flat side and the remainder of the surface is round, wherein a portion of the receiver holder and a portion of the clip plate are attached to opposite sides of the cam apparatus, such that the inner surface of the clip plate faces the outer surface of the receiver holder; and a pivot disposed within the cam apparatus, wherein the clip plate and receiver holder are rotatable about the pivot to maintain the receiver holder in a first position, second position, and third position with respect to the clip plate to be held in each position by the cam apparatus frictionally engaging the receiver holder, wherein the flat side of the cam is friction engaged with the outer surface of the receiver holder when the clip holder is in the first position, and wherein a portion of the round cam surface is friction engaged with the outer surface of the receiver holder when the clip holder is in the second position and the third position.

* * * * *